Sept. 28, 1965   N. W. WEISSMANN   3,208,607
KNIVES FOR STORAGE BINS
Filed Aug. 15, 1963
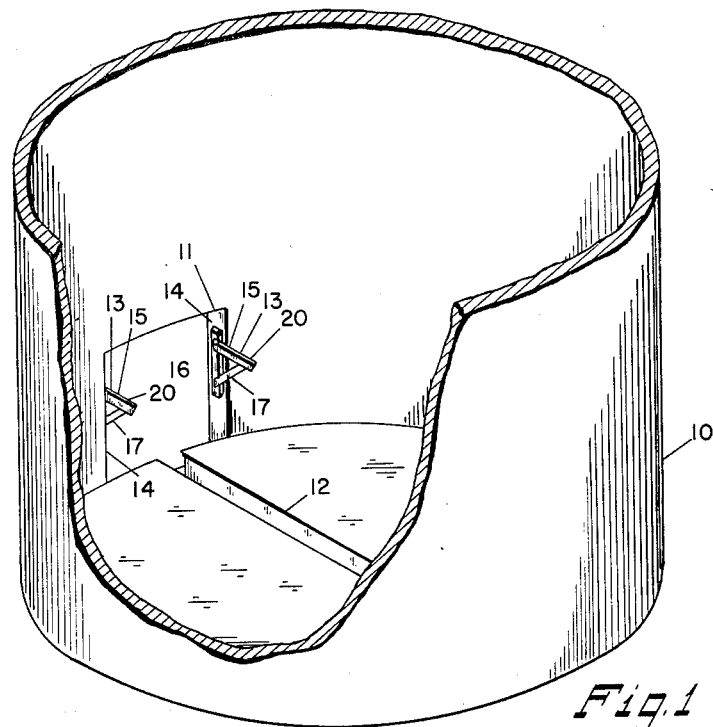
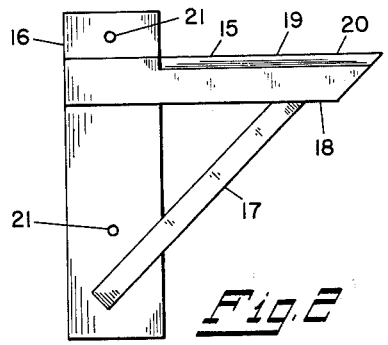
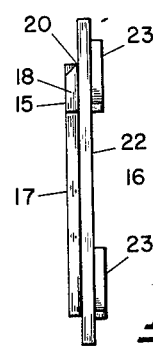
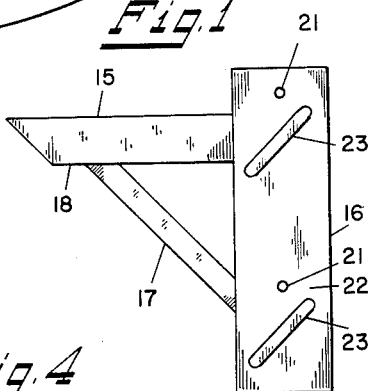
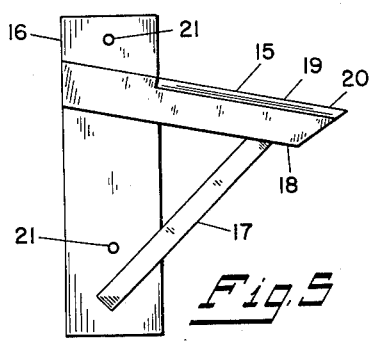
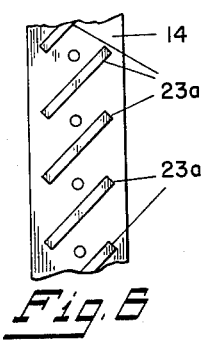
INVENTOR.
NORBERT W. WEISSMANN
BY Joseph G. Werner
ATTORNEY

United States Patent Office 3,208,607
Patented Sept. 28, 1965

3,208,607
KNIVES FOR STORAGE BINS
Norbert W. Weissmann, Rte. 1, Columbus, Wis.
Filed Aug. 15, 1963, Ser. No. 302,357
7 Claims. (Cl. 214—17)

My invention relates to an improved knife.

One popular type of storage bin or silo in common use today is that in which the unloader for the silo is submerged in the stored material. Typically, such a silo has a wall opening near its bottom and an elongated trench running along its floor in communication with the opening. The unloader travels into and out of the silo through the opening.

Broadly, a typical submerged unloader has two basic components. The first is a conveyor chain which conveys the stored material out of the silo. The second is a rotating cutter arm which sweeps the stored material to the conveyor chain. When in the silo, the conveyor chain assembly rests in the trench in the silo floor, and the cutter arm projects upward from the conveyor chain assembly out of the trench and into the mass of stored material.

A burdensome operational difficulty has arisen in the use of such submerged unloaders. When in steady operation, it is necessary to lubricate the essential moving parts of the unloader about once a day. Yet after steady operation the downwardly settling stored material being unloaded usually packs itself solidly around the opening. Some of this packed material must be removed to expose those parts of the unloader which must be lubricated. Removal of the packed material usually requires strenuous labor with a pitch fork, a hook or some other similar instrument. As a result of the difficulty, the operator often neglects to lubricate the unloader as often as recommended. Failure to lubricate accelerates deterioration and breakdown of the unloader equipment.

What has clearly been needed is a device which makes easily accessible the parts of the unloader which must be lubricated, even after a long period of steady operation. My invention is such a device.

A primary object of my invention is to provide a sturdy knife whose blade may safely withstand great pressures without breaking.

Another object of my invention is to provide a silo with such knives to cut the stored material as it settles downward and is removed from the silo by a submerged unloader.

Other objects and advantages of my invention will be apparent from the following detailed description taken in conjunction with the accompanying drawings wherein a preferred embodiment of the principles of the invention has been selected for exemplification.

In the drawings:

FIG. 1 is a broken away perspective view of a silo installed with my novel knives.

FIG. 2 is a front plan view of a knife of my invention.

FIG. 3 is a rear plan view of the knife of FIG. 2.

FIG. 4 is a front view of the knife of FIG. 2.

FIG. 5 is a front plan view of a different embodiment of my novel knife.

FIG. 6 is a partial side elevation view of one side of the opening in the silo of FIG. 1 with my knife removed from the side.

The silo or storage bin 10 shown in FIG. 1 is one adapted to be unloaded by a submerged unloader. Typical of such silo is the A. O. Smith Harvestore silo. An unloader enters and leaves the silo 10 through the wall opening 11. The conveyor chain assembly of the unloader rests in the trench 12.

The novel means employed to prevent the stored material from packing itself solidly at the opening 11 is the pair of knives 13. One of the knives 13 projects from each of the substantially vertical sides 14 of the opening 11 into the interior of the silo 10.

These knives 13 cut and break up the stored material as it settles toward the bottom of the silo 10 by a submerged unloader. To accomplish the desired effect of breaking up the stored material before it reaches the submerged unloader, the knives 13 must be spaced vertically at least some slight distance above the top of the unloader. Usually this requires that the knives project into the silo 10 from near the top of the opening 11, as shown in FIG. 1.

The knives 13 must be durable and rugged to withstand the large pressures put on them by the stored material. A preferred embodiment of the knives 13 which achieves this durable and rugged construction is illustrated in FIGS. 2 to 4.

Each knife 13 is preferably composed of three basic elements, a blade 15, a mounting bar 16 and a blade support bar 17. The blade 15 projects in substantially perpendicular relation from the mounting bar 16, to which it is rigidly secured by any suitable means. The blade support bar 17 extends from the mounting bar 16 to the free end 18 of the blade 15. It is attached to them by any suitable means. Together, the blade 15, the mounting bar 16 and the support bar 17 form a structurally rigid triangle.

The top 19 of the blade 15 is sharpened to a cutting edge 20. As shown in FIG. 2, the blade 15 is preferably substantially horizontal and the cutting edge 20 faces upward when the knife 13 is mounted in the silo 10.

The mounting bar 16 contains holes 21 through which any suitable fastening means may be inserted to attach the mounting bar 16 and thereby the knife 13 to the side 14 of the opening 11 of the silo 10. To further insure the secure attachment of the knife 13 to the silo 10, the surface 22 of the mounting bar 16 which engages a side 14 of the silo opening 11 carries a plurality of diagonal lugs 23. These lugs 23 engage corresponding lugs 23a, shown in FIG. 6, projecting from the sides 14 of the silo opening 11.

A different embodiment of my novel knife 13 is shown in FIG. 5. Corresponding elements of the embodiment of FIG. 5 and the embodiment of FIGS. 2 to 4 carry the same reference numerals. There is only one basic difference between the embodiment of FIGS. 2 to 4 and the embodiment of FIG. 5. The knife 13 of FIGS. 2 to 4 has a substantially horizontal blade 15. In contrast, the knife 13 of FIG. 5 has an inclined blade 15 which slopes downward from the horizontal when the knife 13 is properly mounted in a silo. A downward inclination of the blade 15 is sometimes preferred for its more efficient cutting action. If desired, the blade 15 may also be given an upward inclination. The blade 15 of the FIGS. 2 to 4 may be inclined by simply securing the knife 13 to a silo with the mounting bar 16 inclined to the vertical.

As previously explained, the knives 13 cut and break up the stored material settling down toward the submerged unloader. Because of this cutting action of the knives 13, the settled material is easily and quickly removed through the opening 11 by a workman. Consequently, the workman can rapidly expose the moving parts of the submerged unloader which must be frequently lubricated when the unloader is in steady operation. The tedious labor of removing packed, uncut material from a submerged unloader is eliminated as a result of my inventive knives 13.

It is understood that my invention is not confined to the particular construction and arrangement of parts herein illustrated and described, but embraces all such modified forms thereof as come within the scope of the following claims.

I claim:

1. In a storage bin having a side opening through which an unloader extends into the bin, a pair of blades secured to the side of said bin, said blades being spaced vertically above the top of said unloader and having upward facing edges, one of said blades projecting into said bin from each side of said opening to cut stored material as it moves downward in said bin toward said unloader.

2. The invention of claim 1 wherein the blades are inclined from the horizontal.

3. In a storage bin having a side opening through which an unloader extends into the bin, a mounting bar secured to each of the two sides of said opening, a blade with an upward facing edge projecting from each of said mounting bars into said bin above said unloader to cut stored material as it moves downward in said bin toward said unloader, and a blade support bar extending between each of said mounting bars and the free end of each of said blades respectively.

4. The invention of claim 3 wherein each mounting bar is secured to a side of the opening by means which include a plurality of lugs, said lugs projecting from said mounting bar and engaging corresponding lugs projecting from said side of said opening.

5. A knife for use with a bottom unloading storage bin having a side opening through which an unloader extends into said bin, said knife comprising a blade, means to attach said knife to a side surface of said opening with said blade facing upward and projecting into said bin above said unloader to cut stored material as it moves downward in said bin toward said unloader, and means to support said blade.

6. A knife for use with a bottom unloading storage bin having a side opening through which an unloader extends into said bin, said knife comprising a mounting bar adapted to be secured to a side surface of said opening, a blade projecting from said mounting bar to cut stored material as it moves downward in said bin toward said unloader, and a blade support bar extending between said mounting bar and the free end of said blade in supporting relation.

7. The knife of claim 6 wherein one surface of the mounting bar carries a plurality of lugs.

References Cited by the Examiner
UNITED STATES PATENTS

| 1,217,424 | 2/17 | Eaton | 189—3 |
| 2,635,770 | 4/53 | Tiedemann | 214—17.82 |
| 2,852,053 | 9/58 | Berry et al. | 146—169 |
| 3,145,858 | 8/64 | Helbig | 214—305 |

GERALD M. FORLENZA, *Primary Examiner.*

HUGO O. SCHULZ, *Examiner.*